Dec. 27, 1927.
J. C. BATTLE
SHOCK ABSORBER
Filed June 22, 1926
1,654,399
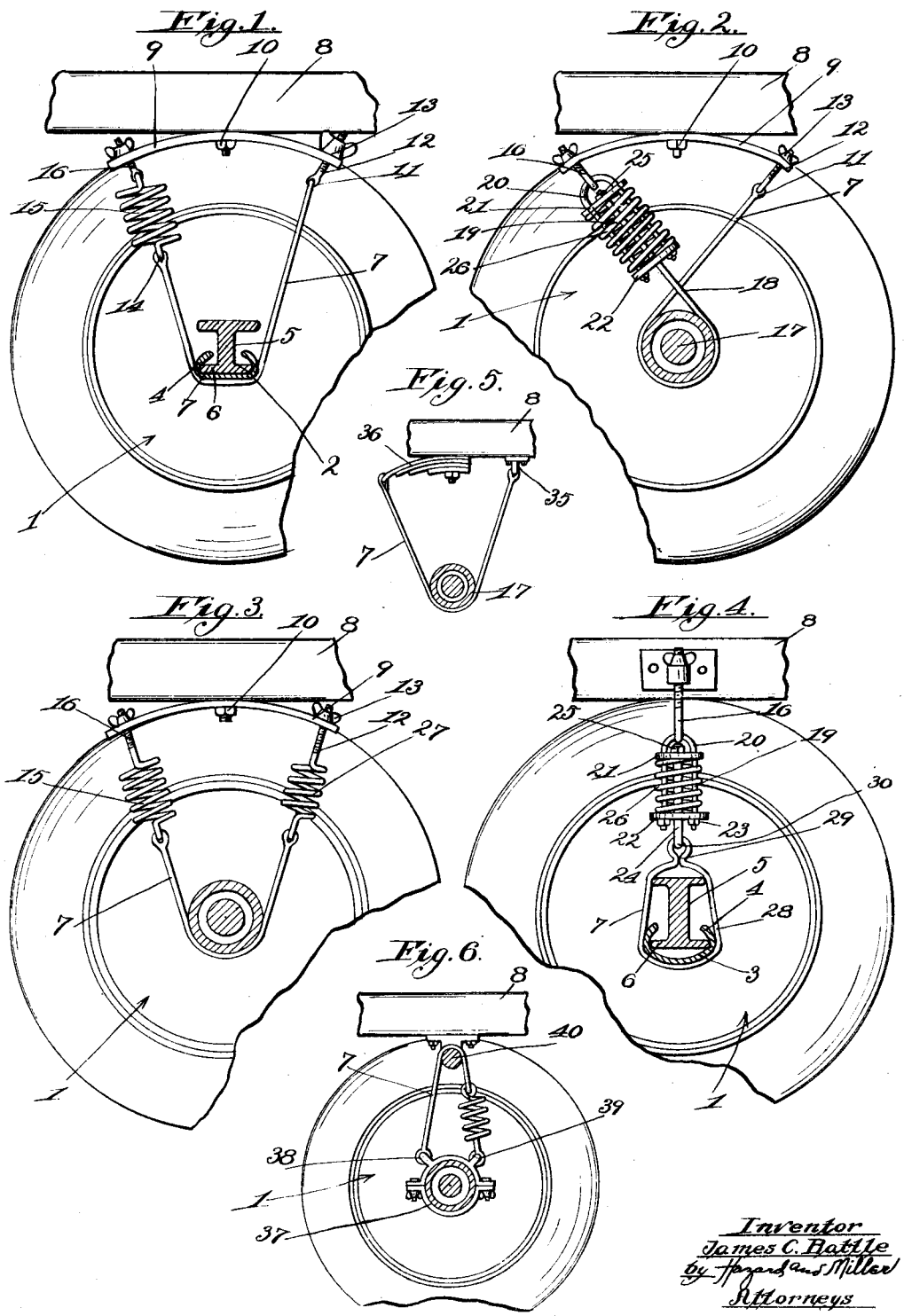

Patented Dec. 27, 1927.

1,654,399

UNITED STATES PATENT OFFICE.

JAMES C. BATTLE, OF LOS ANGELES, CALIFORNIA.

SHOCK ABSORBER.

Application filed June 22, 1926. Serial No. 117,715.

My invention is a shock absorber of the snubber type, adapted to restrain the upward movement of a vehicle frame in reference to the axle or to restrain the downward movement of the axle in reference to a vehicle frame.

An object of my invention is to form a snubber or shock absorber which will prevent the body of the vehicle from having an excessive upward throw due to spring action, and thus preventing what is termed the rebound, restraining the downward movement of the axle in reference to a vehicle frame.

A further object of my invention is to form a snubber utilizing an inextensible strap preferably formed of fabric, this strap passing around an axle and having a spring connected to the strap, the spring strap being so connected to the vehicle that on the upward throw of the body of such vehicle the spring is extended and thereby brings a greater tension on the strap to restrain the movement of the vehicle, also a connection to check downward throw of the axle.

Another object of my invention is to give the strap a partial turn around the axle so that the strap will have a slight slipping action in reference to such axle and thereby more effectively operate as a snubber.

A still further object of my invention is to attach a curved segment device to an I-beam or other angular type of axle, or over a circular axle to prevent wear of the axle or rear axle housing, so that the strap will have a free sliding movement over such curved segment.

A further object of my invention is to utilize a leaf spring connected to one end of the strap, the strap being passed over an axle and connected to a fixed part of the vehicle.

In constructing my shock absorber or snubber I may utilize a number of different procedures. In one instance the strap by a suitable bracket or the like, may be adjustably connected to the frame of a vehicle, the strap forming merely a loop underneath the axle and having a spring connected to the other end of the strap, the spring being connected in some operative manner with the frame of the vehicle, and preferably being adjustable. In another procedure the strap may be given a loop around the axle to increase the friction of movement.

My construction may be reversed if desired, in that the ends of the strap may be attached to the axle housing or a structure connected therewith and the loop of the strap passed over an element or the like attached to the vehicle frame.

Various other arrangements will be apparent from the following description in connection with the drawings, in which;

Figure 1 is an elevation of a wheel, showing a vehicle axle in section and part of a vehicle frame with one type of my shock absorber or snubber connected thereto;

Fig. 2 is a view similar to Fig. 1, showing an alternative form with the strap having a loop around the axle;

Fig. 3 is a still further form in which the strap is provided with a plurality of springs, the springs being attached to both ends of the strap to draw same tightly against the axle or axle housing;

Fig. 4 is still another alternative view, illustrating a relatively non-movable strap attached to an axle and having a compression type of spring between the strap and the vehicle;

Fig. 5 is a further alternative construction with one end of the strap attached to a leaf spring, the other end being secured to the frame and with a loop over the axle;

Fig. 6 is a further alternative form in which the free end of the strap and of the spring are attached to the axle housing, the loop of the strap sliding over a fixed part of the frame.

Referring first to Fig. 1, a wheel is designated by the numeral 1, mounted on an axle 2, which is shown constructed of the I-beam type as is usual in the front axles of automobiles. A curved segment 3 is secured over the lower flange of the I-beam and the ends 4 of this segment are bent in close to the web 5 of the I-beam. It will thus be seen that the lower flange 6 and the edges thereof are completely encased where the strap 7 passes, to reduce the wear on the strap.

The vehicle frame is designated by the numeral 8 and has preferably a strong curved bar or bracket 9 secured to the frame, preferably by a bolt 10. One end of the strap is secured to an eye 11 of a bolt 12, this bolt having an adjusting nut 13 illustrated as a wing nut. The other end of the strap 14 is secured to a tension spring 15, this being attached to the nut adjusting bolt 16, likewise having an adjusting nut.

The action of the snubber of Fig. 1, is substantially as follows:

It will be understood that there will be sufficient tension brought on the strap by utilizing the proper strength of spring and by properly adjusting the bolts 12 and 16, so that on the upward rebound of the vehicle frame due to spring or other action, a sufficient tension is brought on the strap to materially reduce or prevent the upward rebound after a substantially predetermined extension of the spring; that is, my snubber is designed so that it does not positively limit the rebound, but the spring being extensible brings a gradual tensioning of the strap, thereby in small bumps restraining the upward rebound to that allowed by the springs of the vehicle in their normal action, and in excessive rebound, bringing a considerable tension on the strap to resist or stop such action.

In Fig. 2, I illustrate an arrangement particularly suitable for rear axles, having round axle housings, or for a round type of front axle, or else a front axle with a suitable cylindrical casing. In the construction the strap 7 is given a loop around the axle 17, the strap crossing over itself as indicated by the numeral 18. The spring on the end of the strap is attached to the bar 9 in the manner described in connection with Fig. 1.

In the actions of the strap of both Figs. 1 and 2, as the strap is inextensible and the spring extensible, the strap has a sliding motion relative to the axle. This also brings a friction factor into the operation of my shock absorber or snubber in addition to the action of the spring. This materially reduces the upward reaction of the vehicle in a bump and requires using a spring of less strength.

In this illustration I have shown a compression type of spring 19 which is more suited than a tension type to secure accurate adjustment of its strength. This spring is formed with a U-shaped rod 20 extending loosely through an inner plate 21 and being secured to an outer plate 22 by nuts 23 threaded on the end of the rod. A pulling rod 24 extends loosely through the plate 22 and has a nut or swivel head 25 engaging the plate 21. A compression spring 26 is coiled between the two plates and is under compression, normally thrusting these plates apart. The rod 20 is connected to an adjusting bolt 16. A spring of this type is also shown in Fig. 4.

In Fig. 3, the strap 7 is positioned relative to the axle in the same manner as shown in Fig. 1, but an additional spring 27 is utilized, this being connected to the adjusting bolt 12.

In Fig. 4 I show another type of snubber in which a rung or loop formed of a strap 28, completely encircles the axle, preferably having stitching or a rivet 29 forming a small eye 30 in the end of the strap; this being secured to a hook or the like formed on the end of the rod 24 of the compression spring.

The action of the snubber of Figs. 3 and 4 it is believed will be apparent. In this case there is no friction rubbing of the strap on the axle as the strap remains substantially stationary relative thereto, both the springs of Fig. 3 extending on the upward throw of the vehicle and the single spring of Fig. 4 being put under compression.

In Fig. 5, the strap at one end is secured to an eye 35 rigidly connected to the vehicle frame and the other end of the strap is attached to a leaf spring 36, the strap looping around the axle.

In Fig. 6, a clamp 37 is secured to the axle housing and has a plurality of eyes 38 and 39 to which the end of the strap and the spring are secured, the strap passing over a curved bracket 40 depending from the frame.

In reference to the construction of Fig. 2 in which the strap encircles the axle and is crossed over itself, it will be noted that the strap has a binding action on the axle as well as a slipping action, due to the relative movement of the axle towards and from the vehicle frame member and thus forms an effective rebound snubber.

From the above description it will be apparent that I have developed a simple type of shock absorber or snubber which may be attached to different types of axles and thereby form an efficient snubber. It is likewise manifest that the general construction may be changed, or the specific details. Such changes however, would be within the spirit of my invention as set forth in the description, drawings and claims.

Having described my invention, what I claim is:

1. A shock absorber for a vehicle comprising in combination a substantially horizontal vehicle frame member, a vehicle axle, a curved bar, means securing the center part of the bar to the lower part of the frame member, the bar being convexly curved in relation to the frame member, a strap, means adjustably connecting one end of the strap to one end of the bar, the curve of the bar giving a clearance to the adjusting means between the bar and the frame member, the strap partly encircling the axle and crossing over itself, a spring connected to the free end of the strap, and means adjustably connecting the spring to the opposite end of the bar, such end of the bar having a clearance between the frame member to allow access to the adjustable connection.

2. A shock absorber comprising a curved bar adapted to be secured to a straight vehicle frame member at the center of the bar, a strap, means adjustably connecting one end of the strap to one end of the bar, a spring on the free end of the strap, and means to adjustably connect the spring to the other end of the bar.

In testimony whereof I have signed my name to this specification.

JAMES C. BATTLE.